United States Patent
Myung et al.

(10) Patent No.: US 10,678,516 B2
(45) Date of Patent: Jun. 9, 2020

(54) CHATBOT BUILDER USER INTERFACE

(71) Applicant: KAKAO CORP., Jeju-si, Jeju-do (KR)

(72) Inventors: No Suk Myung, Yongin-si (KR); Ji Soo Hwang, Yongin-si (KR); Jun Ki Kim, Suwon-si (KR); Sung Eun Choi, Seongnam-si (KR)

(73) Assignee: KAKAO CORP., Jeju-si, Jeju-Do (KR)

( * ) Notice: Subject to any disclaimer, the term of this patent is extended or adjusted under 35 U.S.C. 154(b) by 21 days.

(21) Appl. No.: 16/225,014

(22) Filed: Dec. 19, 2018

(65) Prior Publication Data
US 2019/0187961 A1 Jun. 20, 2019

(30) Foreign Application Priority Data
Dec. 20, 2017 (KR) ........................ 10-2017-0176127

(51) Int. Cl.
*G06F 8/34* (2018.01)
*G06F 3/0482* (2013.01)
*H04L 12/58* (2006.01)

(52) U.S. Cl.
CPC .............. *G06F 8/34* (2013.01); *G06F 3/0482* (2013.01); *H04L 51/02* (2013.01)

(58) Field of Classification Search
CPC .......... G06F 3/0482; G06F 8/34; G06F 9/451; G06F 16/903; G06Q 50/30; H04L 51/02
USPC .................................................. 717/106–113
See application file for complete search history.

(56) References Cited

U.S. PATENT DOCUMENTS

| | | | |
|---|---|---|---|
| 2012/0041903 A1* | 2/2012 | Beilby ................... | G06N 3/004 706/11 |
| 2014/0122618 A1* | 5/2014 | Duan ...................... | H04L 51/02 709/206 |
| 2018/0107461 A1* | 4/2018 | Balasubramanian ..... | G06F 8/35 |
| 2019/0034409 A1* | 1/2019 | Curtis .................... | G06F 17/279 |
| 2019/0132264 A1* | 5/2019 | Jafar Ali ................. | G06F 9/547 |
| 2019/0182382 A1* | 6/2019 | Mazza ................... | H04M 3/527 |

FOREIGN PATENT DOCUMENTS

KR 101731867 B1 5/2017

* cited by examiner

*Primary Examiner* — Qing Chen
(74) *Attorney, Agent, or Firm* — Hamre, Schumann, Mueller, Larson, P.C.

(57) ABSTRACT

A method for providing a bot builder user interface by a bot builder user interface providing apparatus includes providing a developer device with a bot builder user interface (UI) for producing a chatbot; if at least one sentence is input from the developer device, providing multiple parameters including attribute information regarding respective words included in the at least one sentence; and receiving, from the developer device, grouping information regarding two or more parameters selected from the multiple parameters, wherein the chatbot produced by the developer device is accessible by a user device connecting with a chatbot service server, and if at least one of the two or more grouped parameters is extracted from a sentence of a chat message input by the user device, the chatbot executes a predetermined instruction with reference to the extracted parameter.

15 Claims, 7 Drawing Sheets

| UTTERANCE INPUT | INPUT UTTERANCE OF USER | | | | | |
|---|---|---|---|---|---|---|
| PRESS ENTER AFTER INPUTTING UTTERANCE | | | | | | |

▶ SEND A KAKAOTALK MESSAGE TO OUR TEAM CHAT ROOM
▼ SEND A KAKAOTALK MESSAGE TO MOM

| PARAMETER | ENTITY | EXTRACTION VALUE |
|---|---|---|
| MY KAKAOTALK FRIEND | MY KAKAOTALK FRIEND | MOM |

OPERATION  LINK SET SKILL                                    AUTOMATIC ADDITIONAL LOOK ☐   LINK SKILL ☐

| REQUIRED | PARAMETER NAME | ENTITY | VALUE | DEFAULT VALUE | ASK-BACK QUESTION | VERIFICATION API |
|---|---|---|---|---|---|---|
| ○ | MY KAKAOTALK FRIEND | MY KAKAOTALK FRIEND | $MY KAKAOTALK FRIEND | INPUT | - | - |
| ○ | MY KAKAOTALK CHAT ROOM | MY KAKAOTALK CHAT ROOM | $MY KAKAOTALK CHAT ROOM | INPUT | - | - |

+ CREATE NEW PARAMETER   ⊘ MAKE GROUP

CHATBOT BUILDER USER INTERFACE

CROSS-REFERENCE TO RELATED APPLICATION

This application claims the benefit under 35 USC 119(a) of Korean Patent Application No. 10-2017-0176127 filed on Dec. 20, 2017, in the Korean Intellectual Property Office, the entire disclosures of which are incorporated herein by reference for all purposes.

TECHNICAL FIELD

The present disclosure relates to technologies for providing a bot builder user interface for a developer device.

BACKGROUND

A conventional chatbot refers to an interactive messenger system in which if a question is input into a business messenger like chatting, artificial intelligence (AI) answers the question while chatting with a human being in everyday language based on the result of big data analysis or the like. While a business messenger service is provided, a natural language processing capability can be improved by analyzing a pattern of using a work smartphone/PC or collecting big data such as language mainly used at work. Therefore, the competition among IT companies has become more intense. A business messenger employing such a chatbot function enables checking and processing of information in a chat window without executing an additional app and thus can be used as a platform that connects various functions.

The chatbot is not only for the business messenger. Recently, the use of chatbots has been greatly increased in the whole IT industry. For example, a manager of an Internet shopping mall or homepage needs to allot some time to answer questions of users or creates a FAQ page to provide answers to frequently asked questions. In this way, however, a user needs to wait until the user can directly chat with the manager about what the user wants to know or search the FAQ page. If a chatbot tool is used in this case, it is possible to automatically provide an appropriate answer to the user's question. Therefore, chatbots have been considered essential for business. In particular, as the use of social networking service (SNS)-based messenger services has explosively increased, the technologies of applying the chatbot tool to various functions provided by these messenger services have been greatly developed.

Meanwhile, if the conventional chatbot cannot detect each parameter previously set by a developer (or a chatbot service provider) or cannot detect even a default parameter previously set for the case where each parameter cannot be detected from an utterance sentence input by the user, the user needs to repeatedly ask and answer until the user inputs an utterance corresponding to a preregistered parameter.

SUMMARY

At least some of the embodiments described herein facilitate a bot builder user interface which can be executed on a developer device and more particularly a method and an apparatus for providing a bot builder user interface capable of producing a chatbot that extracts a parameter included in a proper group from an utterance sentence input by a user based on parameter grouping and rapidly executes a consequent instruction.

However, problems to be solved by the present disclosure are not limited to the above-described problems. There may be other problems to be solved by the present disclosure.

At least some of the embodiments described herein pertain to a method for providing a developer device with a bot builder user interface (UI) for producing a chatbot; if at least one sentence is input from the developer device, providing multiple parameters including attribute information regarding respective words included in the at least one sentence; and receiving, from the developer device, grouping information regarding two or more parameters selected from the multiple parameters, wherein the chatbot produced by the developer device is accessible by a user device connecting with a chatbot service server, and if at least one of the two or more grouped parameters is extracted from a sentence of a chat message input by the user device, the chatbot executes a predetermined instruction with reference to the extracted parameter.

At least one of the embodiments described herein pertains to a bot builder user interface providing apparatus that includes: a bot builder user interface (UI) providing unit that provides a bot builder UI for producing a chatbot to a developer device; a parameter extraction unit that provides multiple parameters including attribute information regarding respective words included in at least sentence input from the developer device through the bot builder UI; and a parameter grouping unit that receives, from the developer device, grouping information regarding two or more parameters selected from the multiple parameters, wherein the chatbot produced by the developer device is accessible by a user device connecting with a chatbot service server, and if at least one of the two or more grouped parameters is extracted from a sentence of a chat message input by the user device, the chatbot executes a predetermined instruction with reference to the extracted parameter.

At least one of the embodiments described herein pertains to a computer-readable storage medium that stores a program to execute a method for providing a bot builder user interface that includes: providing a developer device with a bot builder user interface (UI) for producing a chatbot; if at least one sentence is input from the developer device, providing multiple parameters including attribute information regarding respective words included in the at least one sentence; and receiving, from the developer device, grouping information regarding two or more parameters selected from the multiple parameters.

According to any one of the embodiments described above, when a bot builder user interface for producing a chatbot is provided, it enables a developer to directly select multiple parameters into a group. Thus, a parameter including an entity extracted from a user's utterance sentence input into the chatbot can be searched by group. Therefore, the chatbot can rapidly check and execute an instruction suitable therefor.

Conventionally, when a chatbot service is provided, multiple blocks needs to be constructed separately for each parameter. However, according to any one of the embodiments described above, multiple parameters are grouped and thus can be processed by just a single block.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3A, FIG. 3B, FIG. 4, FIG. 5A and FIG. 5B are example display depictions of a chatbot builder user interface to explain a parameter grouping method in accordance with various embodiments described herein.

DETAILED DESCRIPTION

Figure 1:
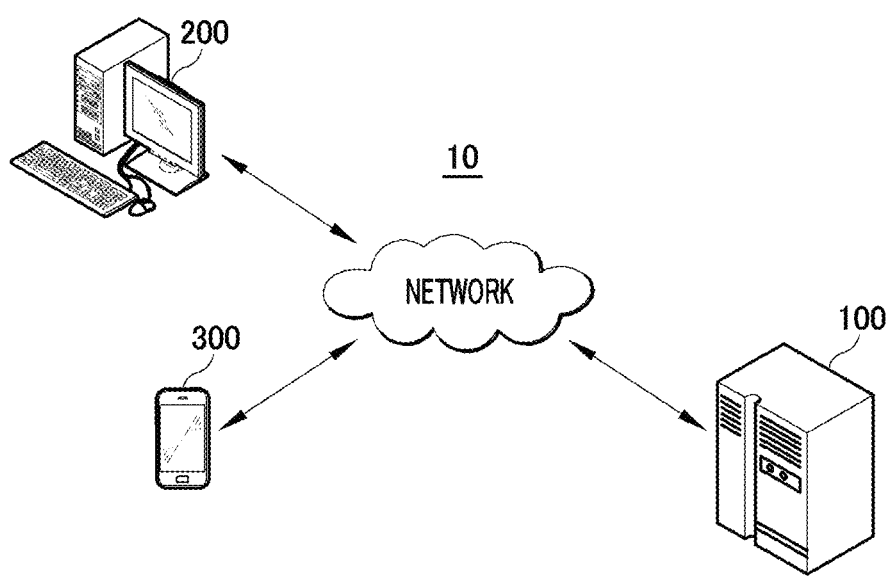
FIG. 1 is an illustration of an example of a chatbot service providing system including a chatbot builder user interface providing apparatus in accordance with various embodiments described herein.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

FIG. 1 is an illustration of an example of a chatbot service providing system including a chatbot builder user interface providing apparatus in accordance with at least one embodiment described herein.

As shown in FIG. 1, a chatbot service providing system 10 includes a chatbot builder user interface providing apparatus, a developer device 200, and a chatbot user device 300. Besides, the chatbot service providing system 10 to which an embodiment of the present disclosure can be applied may further include external servers (not illustrated) that perform processes corresponding to various functions (i.e., instructions) which can be provided through a chatbot service, and these external servers are linked to the chatbot builder user interface providing apparatus 100.

Herein, the developer device 200 refers to a device used by a certain developer and may include devices connected to the chatbot builder user interface providing apparatus 100 which is a kind of server device for producing a chatbot. A developer may be a user previously registered at the chatbot builder user interface providing apparatus 100. Further, the chatbot user device 300 refers to a device used by a certain user who wants to use the chatbot service and may include devices connected to an external server (e.g., a messenger service server) to which the chatbot service is provided.

In an embodiment of the present disclosure, the chatbot builder user interface providing apparatus 100 is operated separately from a server that provides the chatbot service but linked to the server to transmit and receive data for the chatbot service. However, the chatbot builder user interface providing apparatus 100 according to another embodiment of the present disclosure may be combined with the server that provides the chatbot service and may be, for example, a messenger service server that operates a person-to-person messenger service and a chat room established by a preregistered company (or public institution, business, organization, etc.) for providing a specific service.

Figure 2:
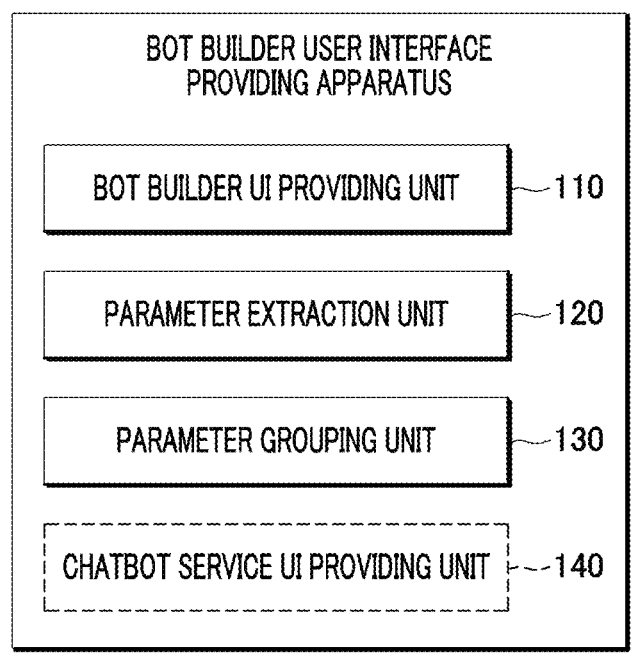
FIG. 2 is block diagram illustrating an example of a chatbot builder user interface providing apparatus in accordance with various embodiments described herein.

FIG. 2 is a block diagram illustrating an example of a chatbot builder user interface providing apparatus in accordance with an embodiment of the present disclosure.

Referring to FIG. 2, the chatbot builder user interface providing apparatus 100 includes a bot builder UI providing unit 110, a parameter extraction unit 120, and a parameter grouping unit 130. The chatbot builder user interface providing apparatus 100 may further include a chatbot service UI providing unit 140 configured to drive a chatbot produced by each developer device 200.

The bot builder UI providing unit 110 provides a bot builder user interface (UI) for producing a chatbot to the developer device 200. Thus, the bot builder UI is driven on the developer device 200.

If at least one sentence (i.e., utterance sentence) is input by the developer through the bot builder UI, the parameter extraction unit 120 extracts multiple parameters including attribute information regarding respective words included in each sentence. For example, the parameter extraction unit 120 may extract multiple parameters from each word included in each sentence.

The term "parameter" used herein refers to any value (i.e., an entry value) extracted from the user's utterance, the term "entity" used herein refers to a kind of data dictionary that extracts parameter values for a chatbot to take actions from the user's chat and defines the parameter values to be transferred, the term "intent" used herein refers to the basic unit of user intent, and the term "block" used herein refers to a module that finds the user's intent from the user's utterance and defines an action to be taken by a chatbot and an answer to be made by the chatbot according to a predetermined format. For reference, the intent and the block can be used with the same meaning.

Each parameter extracted through the parameter extraction unit 120 includes an entity for a word included in at least one sentence, an extraction value, and a name. In this case, an entity refers to information about a category of a word and an extraction value refers to a text constituting the word. Further, the name refers to information about an attribute of the entity and may be arbitrarily determined by a developer or automatically set by an entity name. In this case, the name can be changed or modified after being automatically set by the corresponding entity name or arbitrarily determined by the developer.

For example, if the developer inputs a sentence such as "Chat to Gildong Hong to send a gift from Busan to Seoul", an intent may be "send a message", entities may be "city" corresponding to "Busan, Seoul", "person" corresponding to "Gildong Hong", "message transmission" corresponding to "chat to" and "target" corresponding to "gift", parameter names may be "departure point" corresponding to "Busan" and "destination" corresponding to "Seoul", and extraction values may be extracted words such as "Busan", "Seoul", "Gildong Hong", "chat to" and "gift".

If the developer selects two or more parameters from the multiple parameters through the bot builder UI, the parameter grouping unit 130 may receive, from the developer device 200, grouping information regarding the selected two or more parameters to include them in a group.

Meanwhile, a chatbot produced by the developer is accessible by user device 300 connecting with the chatbot builder user interface providing apparatus 100.

In this case, the chatbot service UI providing unit 140 provides a chatbot service UI to the user device 300. Further, if the chatbot service UI providing unit 140 extracts any one or more of the previously grouped two or more parameters from a sentence of a chat message input by the user through the chatbot service UI, the chatbot service UI providing unit 140 executes a predetermined instruction to the group with reference to the extracted parameter. Specifically, the chatbot service UI providing unit 140 may provide a chat message including an appropriate answer to the user device 300 according to an instruction corresponding to the extracted parameter. In this case, the chatbot service UI providing unit 140 may transmit information about the instruction corresponding to the extracted parameter to an external server corresponding to the chatbot among previously linked external servers (not illustrated) to enable the external server to perform a predetermined function. Then, the chatbot service UI providing unit 140 receives a result of the function performed according to the instruction from the external server, creates a chat message corresponding to the result, and provides the user device 300 through the chatbot service UI.

For reference, the above-described chatbot builder user interface providing apparatus 100 according to an embodiment of the present disclosure may be configured including a memory in which a bot builder program (or application) for providing a parameter grouping-based bot builder UI to the developer device 200 is stored and a processor configured to execute the program. Herein, the processor may perform various functions upon execution of the program stored in the memory, and the components of the processor may be represented by the bot builder UI providing unit 110, the parameter extraction unit 120, the parameter grouping unit 130, and the chatbot service UI providing unit 140 according to the respective functions as described above.

Hereinafter, the structure and operation of the bot builder UI will be described in more detail with reference to FIG. 3A, FIG. 3B, FIG. 4, FIG. 5A and FIG. 5B.

FIG. 3A, FIG. 3B, FIG. 4, FIG. 5A and FIG. 5B are example display depictions of a chatbot builder user interface to explain a parameter grouping method in accordance with an embodiment of the present disclosure.

Figure 3A:
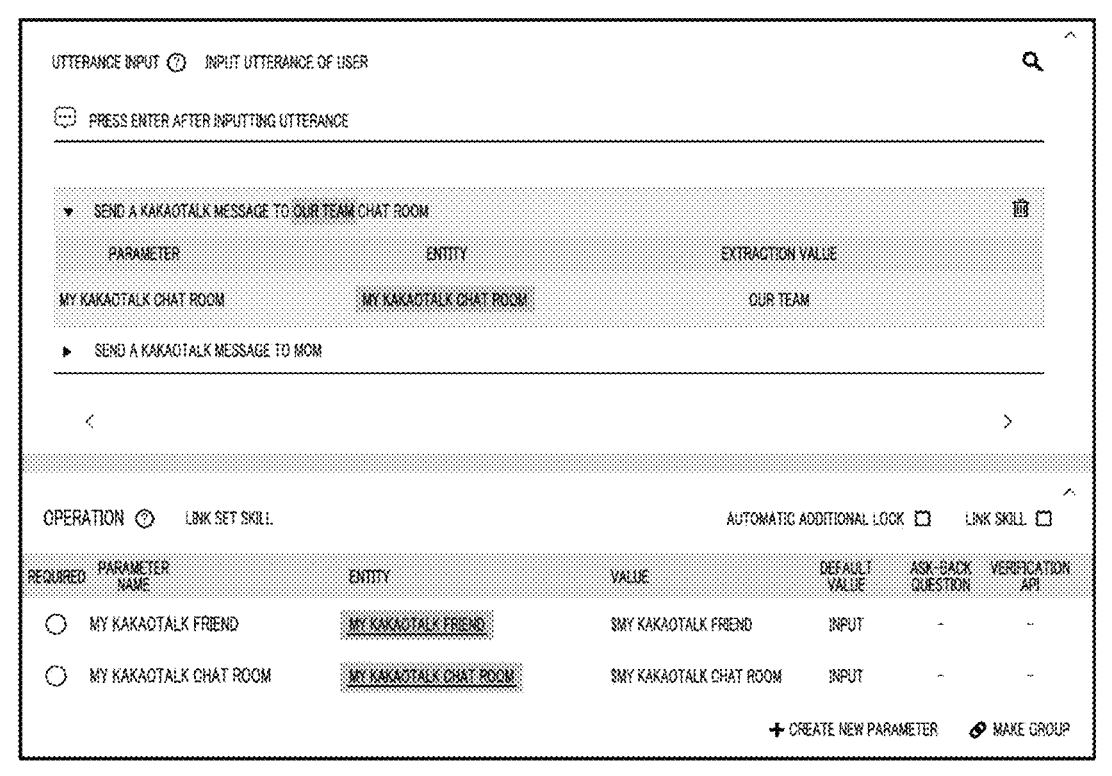

Referring to FIG. 3A and FIG. 3B, the bot builder UI provided through the bot builder UI providing unit 110 sets block information for each intent that the developer wants to input (i.e., set) and receives at least one sentence from the developer and stores the at least one sentence for each block information. Herein, the intent refers to an intention instructed by a sentence and multiple sentences can be stored for each block information.

As shown in FIG. 3A and FIG. 3B, the developer may input sentences such as "Send a Kakaotalk message to our team chat room" or "Send a Kakaotalk message to mom" through the bot builder UI. In this case, these two sentences are example sentences input by the developer for parameter grouping for the intent of send a message.

Then, the parameter extraction unit 120 extracts multiple parameters including attribute information regarding respective words included in the at least one input by the developer through the bot builder UI. In this case, as shown in FIG. 3A and FIG. 3B, the parameters are shown adjacently to each sentence by the developer on the bot builder UI. An entity in each parameter and a word in a sentence relevant to the entity may be shown with a same identification mark to identify which word is relevant to which parameter. As shown in FIG. 3A and FIG. 3B, for example, a parameter name "my Kakaotalk chat room", an entity "my Kakaotalk chat room" and an extraction value "our team" may be displayed under the sentence "Send a Kakaotalk message to our team chat room" through the bot builder UI. Further, for example, a parameter name "my Kakaotalk friend", an entity "my Kakaotalk friend" and an extraction value "mom" may be displayed under the sentence "Send a Kakaotalk message to mom" through the bot builder UI. The text values of these entities and parameter names can be modified by the developer through the bot builder UI.

Figure 4:
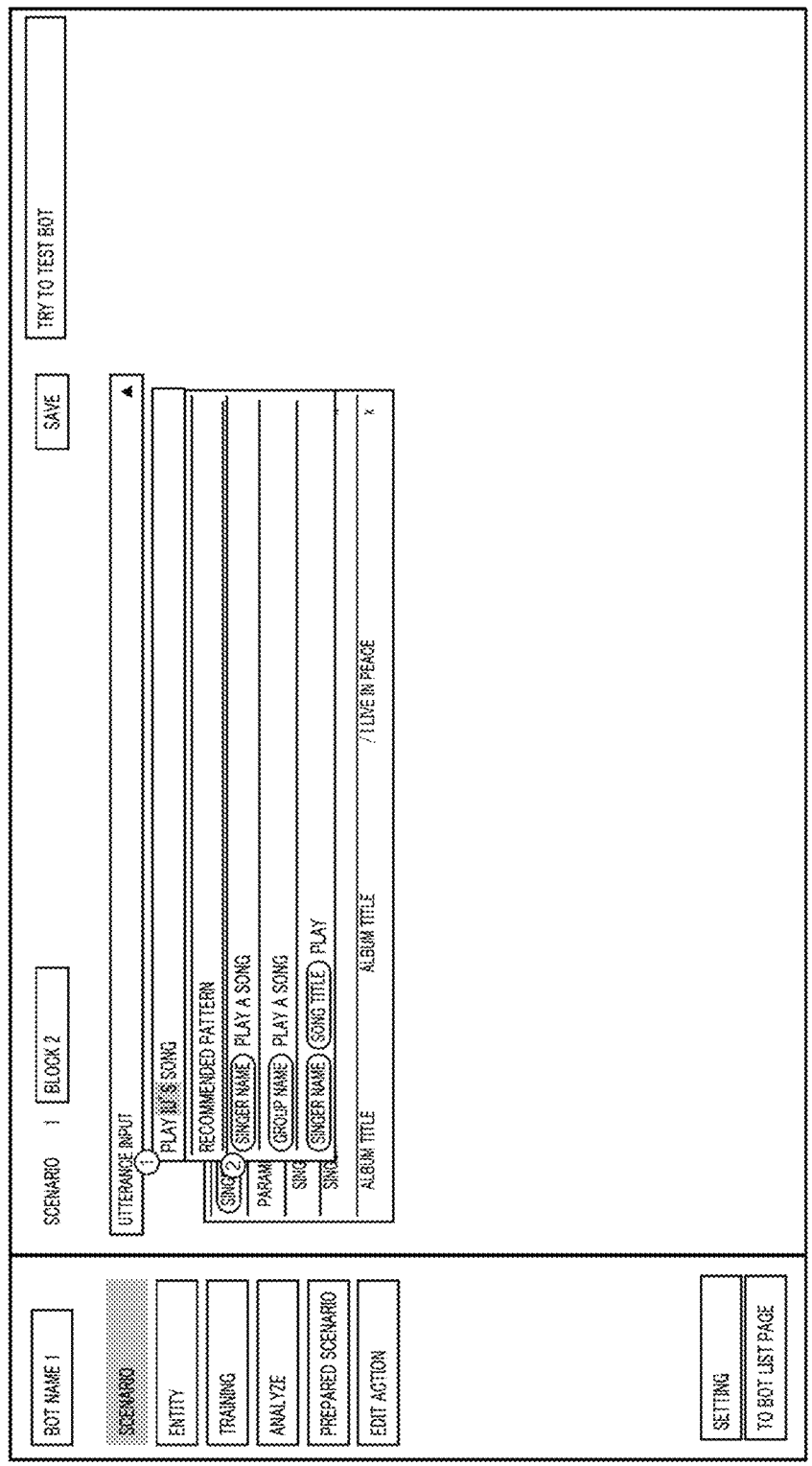

In an additional embodiment, as shown in FIG. 4, if at least one sentence is input from the developer device 200, at least one parameter of words included in the at least one sentence may be recommended with reference to preregistered word information and parameter. That is, at least one predetermined word and an entity matched with the word are registered as interrelated with each other in the server. In this case, if the server identifies an entity for a word input from the developer device 200 and finds that parameter relevant to the entity has been registered, the parameter may be recommended. Otherwise, in an additional embodiment, if a matching pair of word information and parameter has been previously registered in the server, each word in a sentence input from the developer device 200 may be compared with the matching pair to determine which parameter is to be recommended. Further, the server may recommend at least one determined parameter. FIG. 4 shows that "singer name", "group name", "song title", and the like are recommended for a word "IU" (a South Korean singer-songwriter and actress). Then, the server may receive input of selection from the developer device 200 and then designate parameter according to the input of selection as parameter for a word in the sentence input from the developer device 200.

That is, the parameter can be easily registered based on the recommendation of the server.

Further, the parameter grouping unit 130 provides a parameter grouping button in a region of the bot builder UI and if the parameter grouping unit 130 receives input from the developer through the parameter grouping button, the parameter grouping unit 130 provides a parameter grouping UI that groups parameter into a group. The parameter grouping button and the parameter grouping UI can be implemented in the bot builder UI.

Figure 5A:
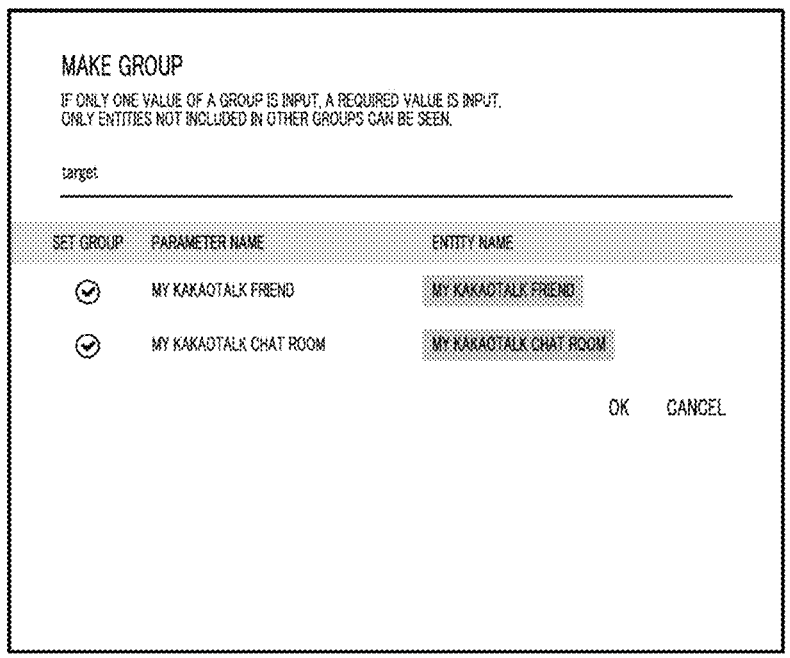

Specifically, as shown in FIG. 3A and FIG. 3B, a button named "Create Group" is provided and if the developer selects the button, the parameter grouping UI is provided as shown in FIG. 5A. In this case, the parameter grouping UI provides an array of at least one pre-generated parameter and also provides a check box for each of the pre-generated parameter. Further, the parameter grouping unit 130 performs grouping to at least two parameter selected by the developer through the check box and generates grouping information. FIG. 5A shows that the two parameters "my Kakaotalk friend" and "my Kakaotalk chat room" in one group are grouped corresponding to the same intent "send a message". Accordingly, when the chatbot service is provided later, even if any one of the parameters "my Kakaotalk friend" and "my Kakaotalk chat room" is extracted from an utterance sentence (e.g., a chat message) input by the user device 300, an instruction (or function) corresponding to the intent can be executed.

Further, when the parameter grouping unit 130 completes the grouping of the two or more parameters selected by the developer device 200, the parameter grouping unit 130 provides a grouping identification mark to each parameter belonging to the same group to distinguish a plurality of groups. In this case, each parameter included in the grouping information corresponds to required parameter which needs to be extracted from a chat message input by the user in order for the chatbot to answer or execute an instruction in response to the chat message, or optional parameter that enables the chatbot to selectively answer or execute an instruction if the optional parameter is included in the chat message input by the user.

Figure 5B:
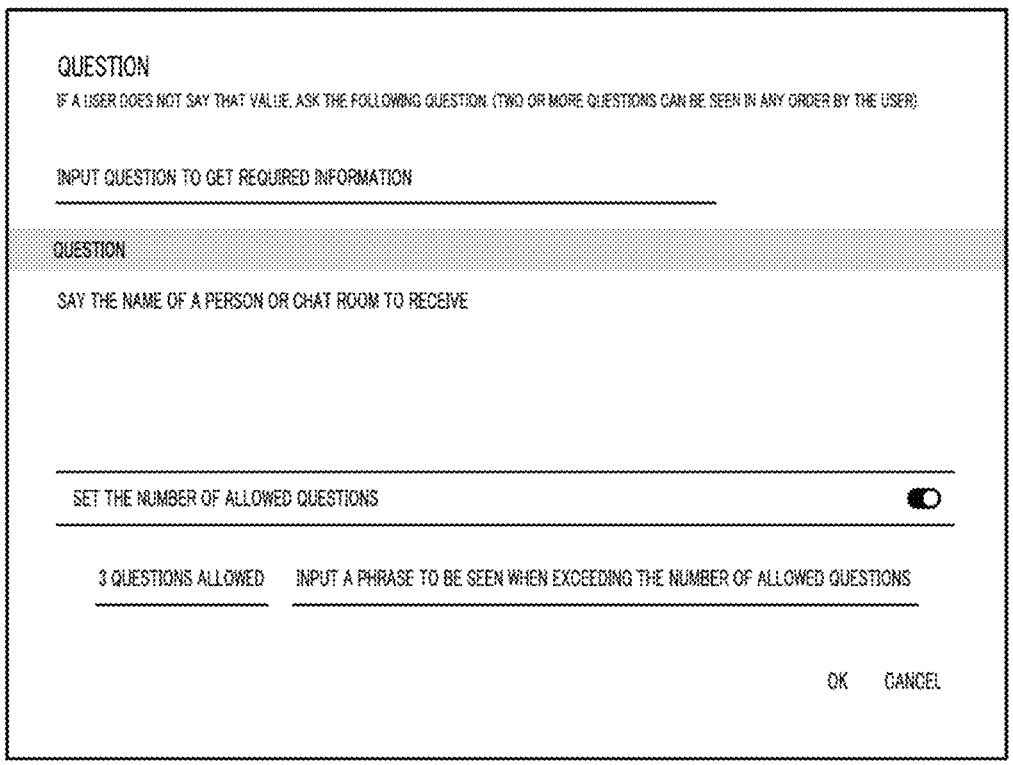

Meanwhile, referring to FIG. 5B, the parameter grouping unit 130 may further provide a question UI to request input of "question" about the grouping information. In this case, the question is a question to receive an additional chat message (i.e., to induce an answer) including any one parameter included in the grouping information if any one of parameters included in the grouping information is not extracted from a sentence of a chat message input by the user when the chatbot service is provided later. Further, if two or more questions are input through the question UI, the chatbot can provide any one of the two or more questions in any order when the two or more question are to be output later. Furthermore, the parameter grouping unit 130 may further provide a region to receive input of a maximum number of times for the questions on the question UI.

Hereinafter, a method for providing a parameter grouping-based chatbot builder user interface in accordance with an embodiment of the present disclosure will be described with reference to FIG. 6.

Figure 6:
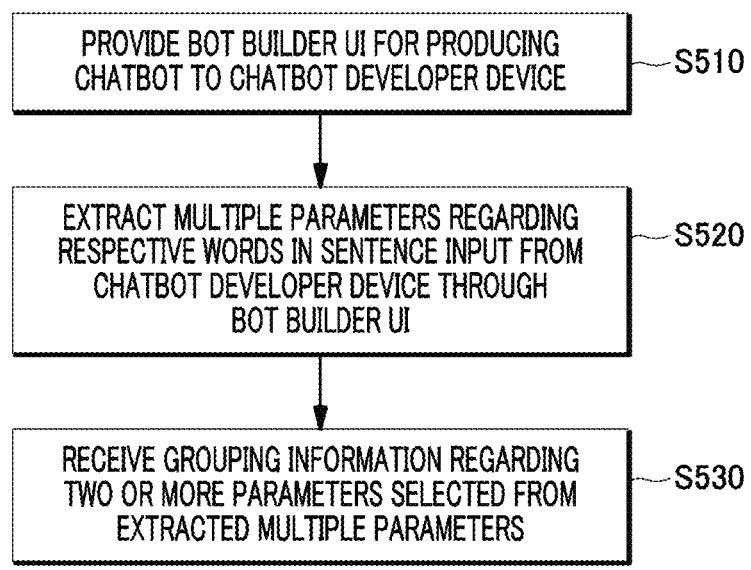
FIG. 6 is a flowchart illustrating an example processing flow for providing a parameter grouping-based chatbot builder user interface in accordance with various embodiments described herein.

FIG. 6 is a flowchart illustrating an example processing flow for providing a parameter grouping-based chatbot builder user interface in accordance with an embodiment of the present disclosure.

First, the bot builder UI for producing a chatbot is provided to the developer device 200 linked to the chatbot builder user interface providing apparatus 100 (S510).

In this case, the bot builder UI displays thereon a block information input interface through which reference sentences (i.e., utterance sentences) are received and stored as matched with respective intents that the developer wants to set.

Then, if at least one sentence is input from the developer through the bot builder UI, parameter which is attribute information of words included in each sentence is extracted (S520).

In this case, a word corresponding to the preset parameter may be extracted from the sentence input by the developer and matched with the parameter and then, the matched parameter may be output to be checked by the developer through the bot builder UI. For example, the parameter may be displayed under each corresponding sentence input by the developer and an entity included in the parameter and a corresponding word in the sentence may be provided with the same identification mark to identify the word.

Then, if the developer selects two or more parameter from the extracted parameter, the selected two or more parameter may be grouped into a group and stored (S530).

In this case, the parameter grouping UI through which two or more of parameters extracted from at least one sentence input by the developer can be selected and the selected two or more parameters can be grouped may be provided.

Meanwhile, the ask-back question UI may be further provided after the two or more parameter is grouped. That is, if any one of the parameters included in grouping information is not extracted from a sentence of a chat message input later by the user through the chatbot, the developer may directly input and store one or more questions to receive an additional chat message including any one parameter included in the grouping information.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for providing a chatbot builder user interface, comprising:
    providing a developer device with a chatbot builder user interface (UI) for producing a chatbot;
    if at least one sentence is input from the developer device via the chatbot builder UI, providing multiple parameters including attribute information regarding respective words included in the at least one sentence; and receiving, from the developer device via the chatbot builder UI, grouping information regarding two or more parameters selected from the multiple parameters including:
  providing a parameter grouping button in a region of the chatbot builder UI; and
  providing a parameter grouping UI if an input is received from the developer device via the chatbot builder UI using the parameter grouping button,
wherein the chatbot produced by the developer device with the chatbot builder UI is accessible by a user device connecting with a chatbot service server, and
if at least one of the two or more parameters is extracted from a sentence of a chat message input by the user device, the chatbot produced by the developer device with the chatbot builder UI executes a predetermined instruction with reference to the extracted at least one of the two or more parameters from the sentence of the chat message input by the user device.

2. The method of claim 1,
wherein in the providing of the developer device with the chatbot builder UI, the chatbot builder UI is provided to set block information for each intent to be input by the developer device with the chatbot builder UI and receive at least one sentence from the developer device with the chatbot builder UI and store the at least one sentence for each block information, and
wherein the intent refers to an intention instructed by a sentence and multiple sentences are stored for each block information.

3. The method of claim 1,
wherein each parameter of the two or more parameters includes an entity for a word included in the at least one sentence, an extraction value, and a name, and
wherein the entity for the word refers to information about a category of the word, the extraction value refers to a text constituting the word, and the name refers to information about an attribute of the entity for the word.

4. The method of claim 3,
wherein the entity for the word and a text value of the name are configured to be modifiable by the developer device with the chatbot builder UI.

5. The method of claim 3,
wherein in the providing of the multiple parameters, the multiple parameters are shown adjacently to each sentence by the developer device with the chatbot builder UI, and an entity in each parameter of the two or more parameters and a word relevant to the entity are shown with a same identification mark to identify which word is relevant to which parameter of the multiple parameters.

6. The method of claim 1,
wherein the parameter grouping UI provides an array of at least one pre-generated parameter and a check box for each pre-generated parameter in the array of at least one pre-generated parameter.

7. The method of claim 6,
wherein the receiving of the grouping information further includes:
grouping at least two pre-generated parameters selected by the developer device with the chatbot builder UI using the check box for each pre-generated parameter of the at least two pre-generated parameters and generating the grouping information.

8. The method of claim 7,
wherein the receiving of the grouping information further includes:
providing a question UI to receive, from the developer device with the chatbot builder UI, at least one question for requesting an input about the grouping information, and
wherein the question UI is designed to receive an additional chat message including any one parameter included in the grouping information if any one parameter included in the grouping information is not extracted from a sentence of a chat message input by the user device.

9. The method of claim 8,
wherein if two or more questions are input, the chatbot produced by the developer device with the chatbot builder UI provides any one of the two or more questions in any order when the two or more questions are to be output.

10. The method of claim 8,
wherein the question UI includes a region to receive an input of a maximum number of times for the at least one question to be provided to the user device.

11. The method of claim 1,
wherein in the receiving of the grouping information, when grouping of the two or more parameters selected by the developer device with the chatbot builder UI is completed, a group identification mark is displayed for each parameter of the two or more parameters belonging to the same group to distinguish a plurality of groups.

12. The method of claim 1,
wherein each parameter of the two or more parameters included in the grouping information corresponds to one of:
a required parameter which needs to be extracted from a chat message input by the user device in order for the chatbot produced by the developer device with the chatbot builder UI to answer or execute an instruction in response to the chat message, or
an optional parameter that enables the chatbot produced by the developer device with the chatbot builder UI to selectively answer or execute an instruction if the optional parameter is included in the chat message input by the user device.

13. The method of claim 1,
wherein the providing of the multiple parameters includes:
if at least one sentence is input from the developer device with the chatbot builder UI, recommending at least one parameter of words included in the at least one sentence with reference to preregistered word information and parameter; and
receiving an input of selection from the developer device with the chatbot builder UI and designating a parameter according to the input of selection as a parameter for a word in the at least one sentence input from the developer device with the chatbot builder UI.

14. A non-transitory computer-readable storage medium that stores a program to execute a method for providing a chatbot builder user interface of claim 1.

15. A chatbot builder user interface providing apparatus, comprising:
  a processor;
  a memory;
  a chatbot builder user interface (UI) providing unit that provides a chatbot builder UI for producing a chatbot to a developer device;

a parameter extraction unit that provides multiple parameters including attribute information regarding respective words included in at least one sentence input from the developer device via the chatbot builder UI; and a parameter grouping unit that receives, from the developer device via the chatbot builder UI, grouping information regarding two or more parameters selected from the multiple parameters including:

providing a parameter grouping button in a region of the chatbot builder UI; and providing a parameter grouping UI if an input is received from the developer device via the chatbot builder UI using the parameter grouping button, wherein the chatbot produced by the developer device with the chatbot builder UI is accessible by a user device connecting with a chatbot service server, and if at least one of the two or more parameters is extracted from a sentence of a chat message input by the user device, the chatbot produced by the developer device with the chatbot builder UI executes a predetermined instruction with reference to the extracted at least one of the two or more parameters from the sentence of the chat message input by the user device.

* * * * *